(12) United States Patent
Chae et al.

(10) Patent No.: US 9,699,749 B2
(45) Date of Patent: Jul. 4, 2017

(54) METHOD AND APPARATUS FOR DEVICE-TO-DEVICE COMMUNICATION IN WIRELESS COMMUNICATION SYSTEM

(71) Applicant: LG ELECTRONICS INC., Seoul (KR)

(72) Inventors: Hyukjin Chae, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 14/648,784

(22) PCT Filed: Dec. 20, 2013

(86) PCT No.: PCT/KR2013/011960
§ 371 (c)(1),
(2) Date: Jun. 1, 2015

(87) PCT Pub. No.: WO2014/098522
PCT Pub. Date: Jun. 26, 2014

(65) Prior Publication Data
US 2015/0319724 A1 Nov. 5, 2015

Related U.S. Application Data

(60) Provisional application No. 61/740,453, filed on Dec. 21, 2012, provisional application No. 61/773,833, (Continued)

(51) Int. Cl.
*H04W 56/00* (2009.01)
*H04W 48/16* (2009.01)
(Continued)

(52) U.S. Cl.
CPC ....... *H04W 56/0015* (2013.01); *H04L 27/261* (2013.01); *H04L 27/2675* (2013.01);
(Continued)

(58) Field of Classification Search
CPC ............ H04W 56/0015; H04W 56/00; H04W 56/001; H04W 8/005; H04W 48/16;
(Continued)

(56) References Cited

U.S. PATENT DOCUMENTS 9,307,510 B2 * 4/2016 Abedini ............ H04W 56/0045
2010/0165882 A1 7/2010 Palanki et al.
(Continued)

FOREIGN PATENT DOCUMENTS

JP 2010532967 10/2010
KR 10-2004-0056474 7/2004
(Continued)

OTHER PUBLICATIONS

PCT International Application No. PCT/KR2013/011960, Written Opinion of the International Searching Authority dated Mar. 31, 2014, 12 pages.
(Continued)

*Primary Examiner* — Warner Wong
(74) *Attorney, Agent, or Firm* — Lee Hong Degerman Kang & Waimey

(57) ABSTRACT

One embodiment of the present invention is a device-to-device (D2D) communication method. According to said method, a first terminal performs D2D communication with a second terminal in a wireless communication system, and comprises the steps of: receiving a first signal from the second terminal; and transmitting a second signal based on the received first signal to a third terminal. The first signal and the second signal are used in acquiring synchronization
(Continued)

related to the D2D communication in each of the first terminal and the third terminal.

11 Claims, 9 Drawing Sheets

Related U.S. Application Data filed on Mar. 7, 2013, provisional application No. 61/823,931, filed on May 16, 2013.

(51) Int. Cl.
| | | |
|---|---|---|
| *H04W 72/04* | (2009.01) | |
| *H04L 29/06* | (2006.01) | |
| *H04L 27/26* | (2006.01) | |
| *H04W 8/00* | (2009.01) | |
| *H04W 88/04* | (2009.01) | |
| *H04L 5/00* | (2006.01) | |

(52) U.S. Cl.
CPC .............. *H04L 65/10* (2013.01); *H04W 8/005* (2013.01); *H04W 48/16* (2013.01); *H04W 56/0025* (2013.01); *H04W 72/0406* (2013.01); *H04L 5/0048* (2013.01); *H04W 88/04* (2013.01)

(58) Field of Classification Search
CPC .............. H04W 72/0406; H04W 88/04; H04L 27/2655; H04L 27/2671
See application file for complete search history.

(56) References Cited

U.S. PATENT DOCUMENTS

| | | | |
|---|---|---|---|
| 2012/0140714 A1 | 6/2012 | Koskela et al. | |
| 2012/0163278 A1* | 6/2012 | Chang | H04L 12/189 370/312 |
| 2012/0250545 A1* | 10/2012 | Papadogiannis | H04W 40/12 370/252 |
| 2013/0077512 A1* | 3/2013 | Chang | H04W 56/001 370/252 |
| 2013/0182699 A1* | 7/2013 | Yamamoto | H04W 56/001 370/350 |
| 2014/0072019 A1* | 3/2014 | Kim | H04B 1/44 375/219 |
| 2014/0321452 A1* | 10/2014 | Choi | H04W 8/005 370/350 |
| 2015/0009949 A1* | 1/2015 | Khoryaev | H04W 48/16 370/330 |
| 2015/0043483 A1* | 2/2015 | Sartori | H04W 72/02 370/329 |
| 2015/0126188 A1* | 5/2015 | Lindoff | H04W 8/005 455/434 |
| 2015/0156165 A1* | 6/2015 | Lindoff | H04W 8/005 370/329 |
| 2016/0021625 A1* | 1/2016 | Li | H04W 72/1289 370/336 |
| 2016/0037466 A1* | 2/2016 | Yang | H04W 48/14 370/350 |
| 2016/0044616 A1* | 2/2016 | Lee | H04W 56/004 370/350 |
| 2016/0087743 A1* | 3/2016 | El Ayach | H04W 52/242 455/452.1 |
| 2016/0165563 A1* | 6/2016 | Jang | H04W 56/0025 370/328 |
| 2016/0212721 A1* | 7/2016 | Sheng | H04W 48/16 |
| 2016/0330702 A1* | 11/2016 | Sorrentino | H04W 56/001 |

FOREIGN PATENT DOCUMENTS

| | | |
|---|---|---|
| KR | 10-2009-0032306 | 4/2009 |
| KR | 10-2010-0038226 | 4/2010 |
| KR | 10-2010-0038441 | 4/2010 |
| KR | 10-2012-0073147 | 7/2012 |
| WO | 2011/011637 | 1/2011 |
| WO | 2011/080533 | 7/2011 |

OTHER PUBLICATIONS

European Patent Office Application No. 13866392.7, Search Report dated Jul. 18, 2016, 7 pages.
Ericsson, "Synchronization Procedures and Signals for D2D Discovery and Communication" 3GPP TSG-RAN WG1, #74, R1-132911, Aug. 23, 2013, 14 pages.
Dahlman et al. "3G Evolution: HSPA and LTE for Mobile Broadband," Dec. 25, 2009, pp. 466-467, 8 pages.
PCT International Application No. PCT/KR2013/011960, Written Opinion of the International Searching Authority dated Mar. 31, 2014, 16 pages.
Janis et al, "Interference-aware resource allocation for device to device radio underlaying cellular networks," XP031474558, 2009, 5 pages.
European Patent Office Application Serial No. 13866392.7, Search Report dated Dec. 9, 2016, 11 pages.

* cited by examiner

CUL: cellular UL
DUL: D2D UL
DDL : D2D DL

CUL: cellular UL
DUL: D2D UL
DDL : D2D DL

METHOD AND APPARATUS FOR DEVICE-TO-DEVICE COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/011960, filed on Dec. 20, 2013, which claims the benefit of U.S. Provisional Application Nos. 61/740,453, filed on Dec. 21, 2012, 61/773,833, filed on Mar. 7, 2013 and 61/823,931, filed on May 16, 2013, the contents of which are all hereby incorporated by reference herein in their entirety.

TECHNICAL FIELD

The following description relates to a wireless communication system and, more particularly, to a method and apparatus for device-to-device (D2D) communication.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication among multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

Device-to-device (D2D) communication refers to a communication scheme for establishing a direct link between user equipments (UEs) and directly exchanging voice, data, etc. between the UEs without intervention of an evolved NodeB (eNB). D2D communication may include UE-to-UE communication, peer-to-peer communication, etc. In addition, the D2D communication scheme is applicable to machine-to-machine (M2M) communication, machine type communication (MTC), etc.

D2D communication has been considered as a method for solving burdens of an eNB due to rapid increase in data traffic. For example, in D2D communication, since data is exchanged between devices unlike an existing wireless communication system, network overload may be reduced. In addition, by introducing D2D communication, decrease in number of procedures performed in an eNB, decrease in power consumption of devices participating in D2D, increase in data transfer rate, increase in network capacity, load distribution, cell coverage enlargement, etc. may be achieved.

DISCLOSURE

Technical Problem

An object of the present invention devised to solve the problem lies in methods for resource usage and synchronization acquisition for enabling an out-of-coverage user equipment (UE) to perform D2D communication.

The technical problems solved by the present invention are not limited to the above technical problems and other technical problems which are not described herein will become apparent to those skilled in the art from the following description.

Technical Solution

The object of the present invention can be achieved by providing a method for, at a first user equipment (UE), performing device-to-device (D2D) communication with a second UE in a wireless communication system including receiving a first signal from the second UE and delivering a second signal based on the received first signal to a third UE, wherein the first and second signals are used for synchronization acquisition related to D2D communication in each of the first UE and the third UE.

In another aspect of the present invention, provided herein is a first user equipment (UE) apparatus for performing device-to-device (D2D) communication with a second UE in a wireless communication system including a reception module and a processor, wherein the processor receives a first signal from the second UE and delivers a second signal based on the received first signal to a third UE, and wherein the first and second signals are used for synchronization acquisition related to D2D communication in each of the first UE and the third UE.

The first and second aspects of the present invention may include the following features.

The first UE may be out of coverage of a cell to which the second UE belongs.

The first signal may include a primary synchronization signal (PSS) and a secondary synchronization signal (SSS) received from a serving cell of the second UE.

A sequence for a primary synchronization signal (PSS) and a sequence for a secondary synchronization signal (SSS) configuring the first signal may be respectively mapped to 62/x subcarriers excluding a direct current (DC) subcarrier and 62/y subcarriers excluding the DC subcarrier and transmitted and x and y may be values selected from divisors of 62.

The first signal and the second signal may be different in a time/frequency domain.

The first signal may be transmitted in a time/frequency domain which does not overlap a primary synchronization signal (PSS) and a secondary synchronization signal (SSS) transmitted by a serving cell of the second UE.

The first UE may deliver the same second signal as the received first signal to the third UE via time-frequency resources different from time-frequency resources used to receive the first signal.

The first UE may perform D2D communication only in a resource block in which receive power of the first signal is equal to or less than a predetermined value.

The first UE may terminate D2D communication during N frames after receiving the first signal.

The first UE may determine transmit power of D2D communication based on receive power of the first signal.

The transmit power of D2D communication may be inversely proportional to the receive power of the first signal.

The first UE may use a downlink frequency band for D2D communication if receive power of the first signal is equal to or less than a predetermined value.

Advantageous Effects

According to the present invention, out-of-coverage UEs can efficiently acquire synchronization and perform D2D communication using resources.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
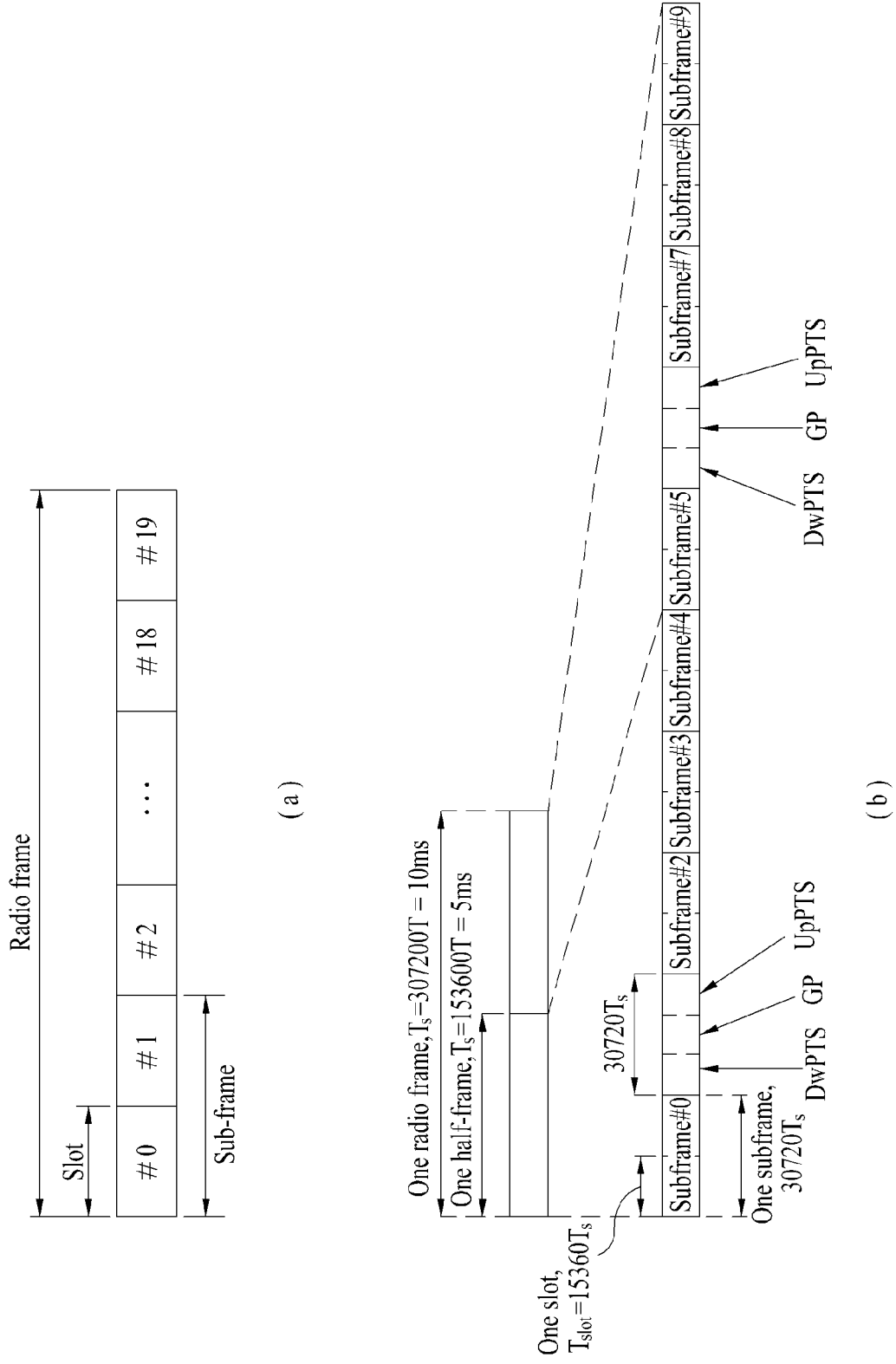
FIG. 1 is a diagram showing the structure of a radio frame.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC- FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
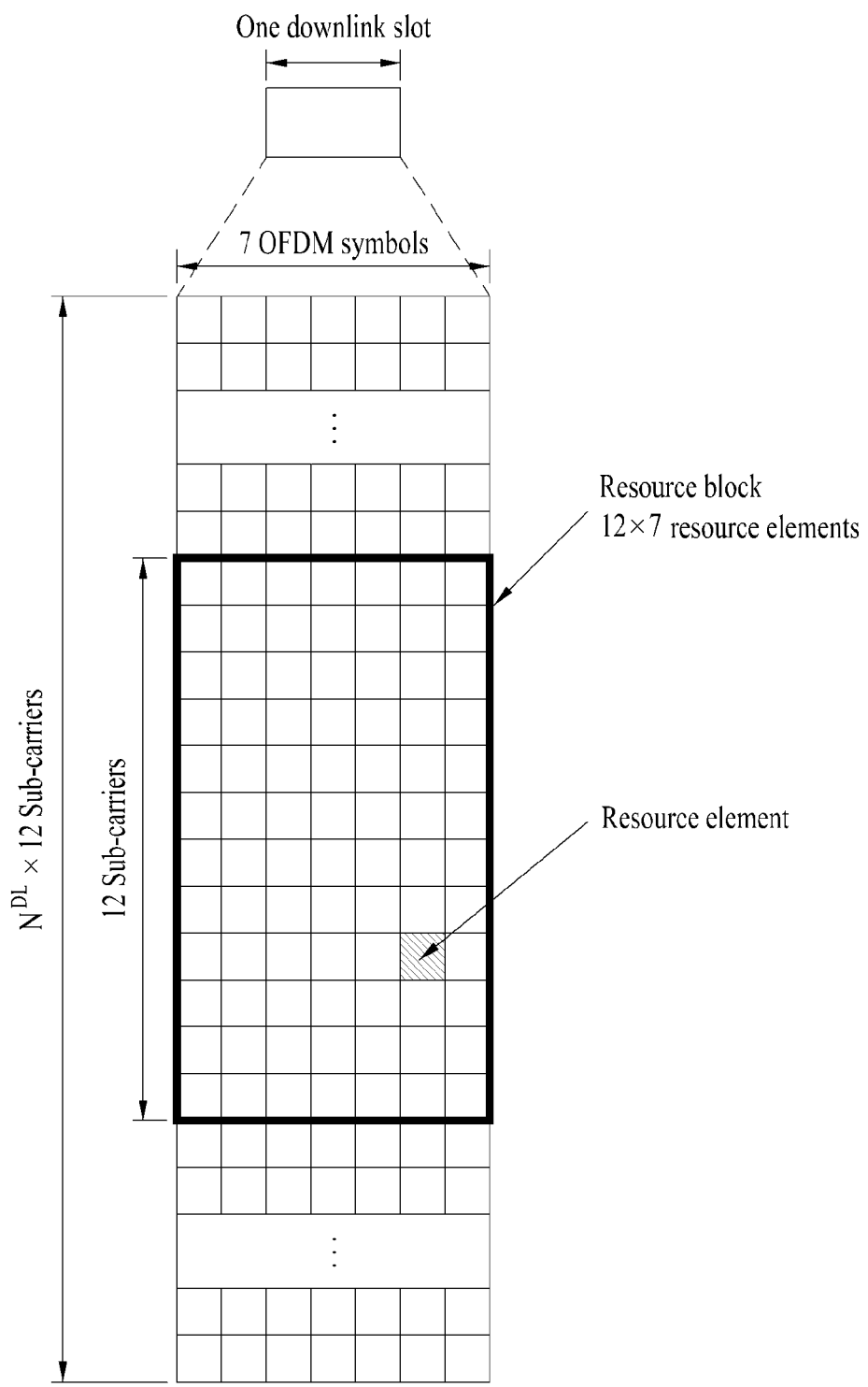
FIG. 2 is a diagram showing a resource grid in a downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12 7 REs. The number NDL of RBs included in a DL slot depends on a DL transmission bandwidth. A UL slot may have the same structure as the DL slot.

Figure 3:
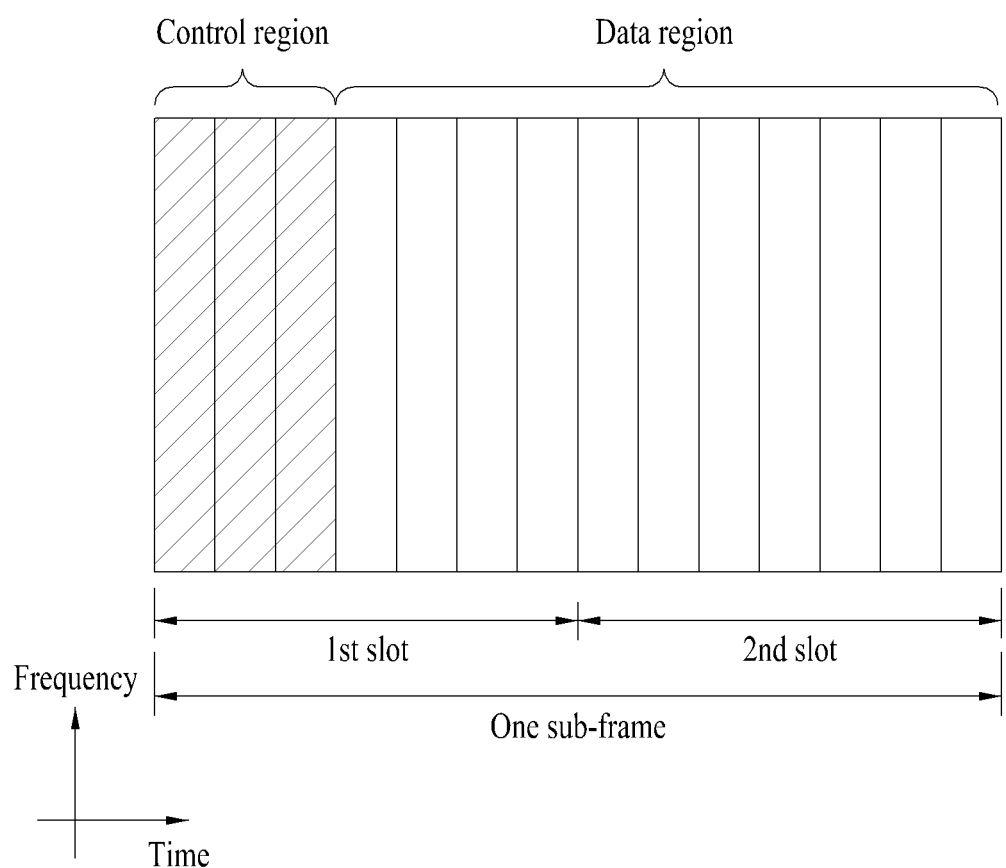
FIG. 3 is a diagram showing the structure of a downlink subframe.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
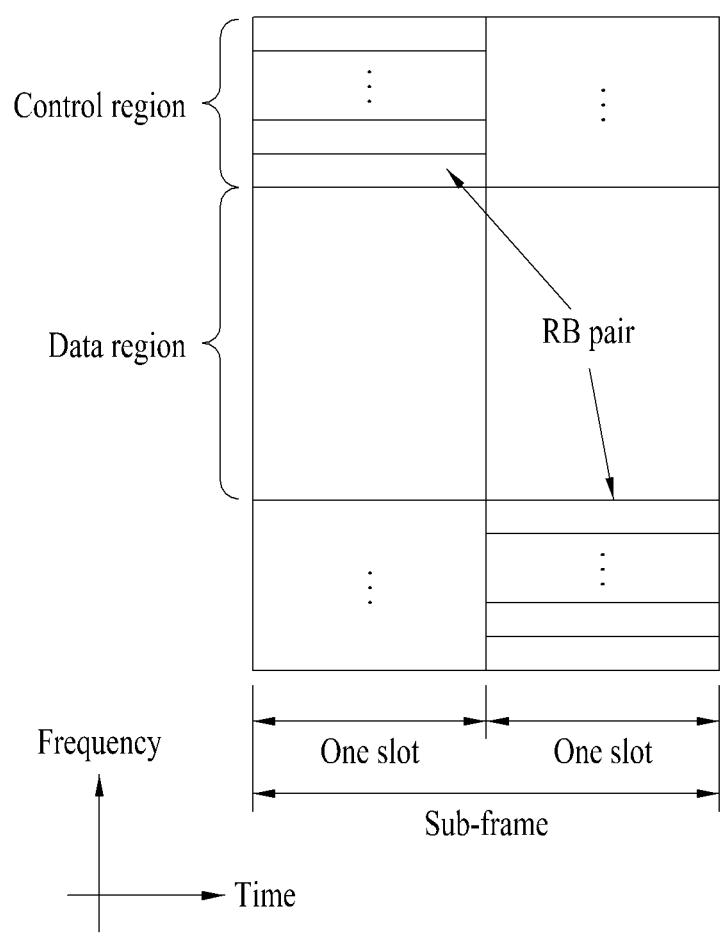
FIG. 4 is a diagram showing the structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

PSS (Primary Synchronization Signal)/SSS (Secondary Synchronization Signal)

Figure 5:
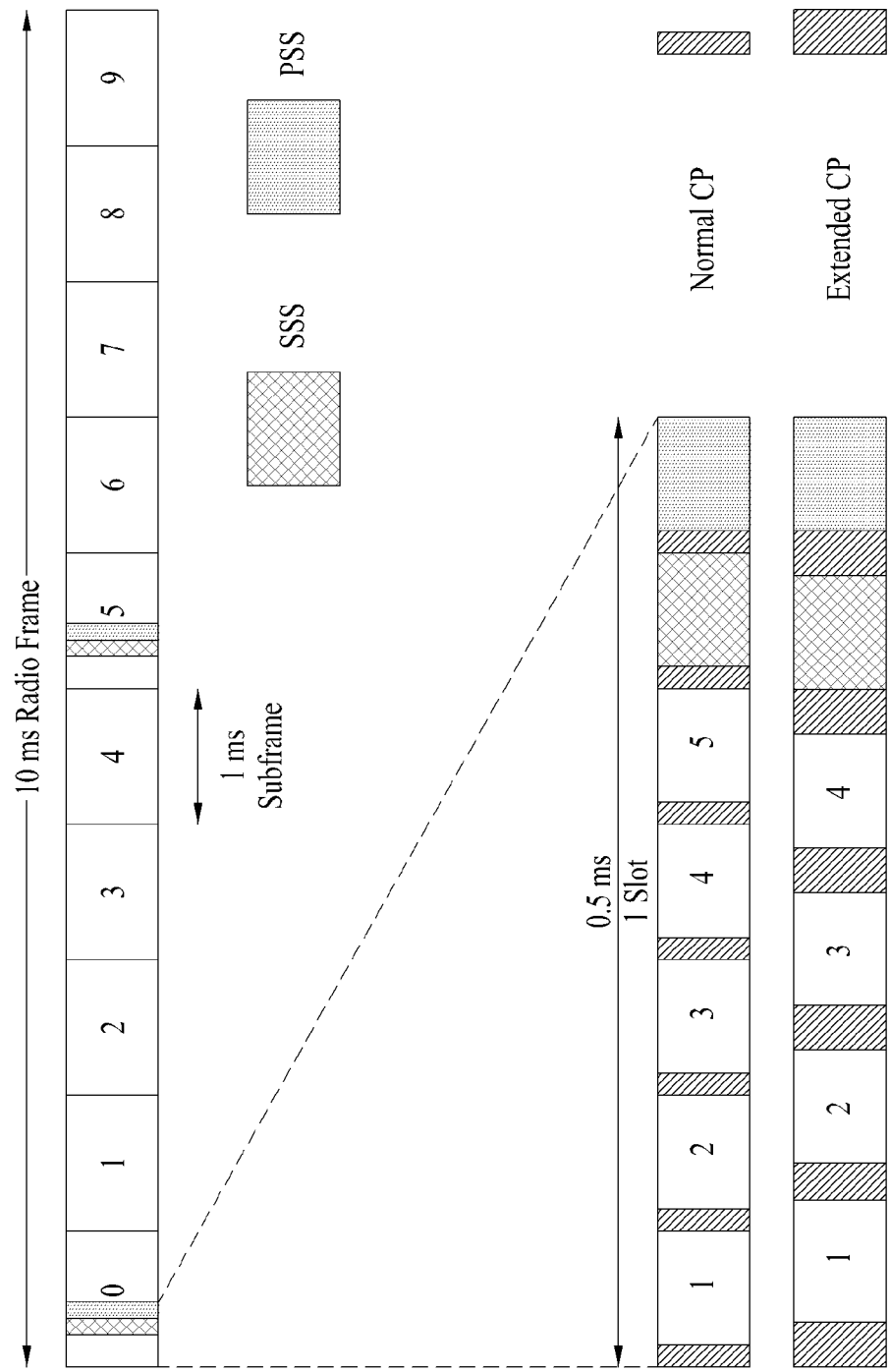
FIG. 5 is a diagram illustrating a synchronization signal.

FIG. 5 is a diagram illustrating a PSS and an SSS, both of which are synchronization signals used for cell search in an LTE/LTE-A system. Prior to a description of the PSS and the SSS, cell search will be described. Cell search is performed when a UE initially accesses a cell, when handover is performed from a currently accessed cell to another cell, or upon cell reselection and may be performed by frequency and symbol synchronization acquisition for a cell, downlink frame synchronization acquisition of a cell, and cell identifier (ID) determination. Three cell identifiers may configure one cell group and 168 cell groups may exist.

For cell search, an eNB transmits a PSS and an SSS. A UE detects the PSS, acquires timing of 5 ms of a cell and confirms a cell identifier within a cell group. In addition, the UE detects the SSS to confirm radio frame timing and cell group.

Referring to FIG. 5, the PSS is transmitted on $0^{th}$ and fifth subframes and, more particularly, is transmitted at a last OFDM symbol of a first slot of each of the $0^{th}$ and fifth subframes. In addition, the SSS is transmitted next to the last OFDM symbol of the first slot of each of the $0^{th}$ and fifth subframes. That is, the SSS is transmitted at the OFDM symbol just before the PSS is transmitted. Such transmission timing corresponds to FDD. In TDD, the PSS is transmitted at a third symbol of each of first and sixth subframes, that is, a DwPTS, and the SSS is transmitted at a last symbol of each of the $0^{th}$ and fifth subframes. That is, in TDD, the SSS is transmitted at a symbol positioned ahead of the transmission position of the PSS by three symbols.

The PSS is a Zadoff-Chu sequence having a length of 63 and is actually transmitted on center 73 subcarriers (72 subcarriers, that is, 6 RBs, if a DC subcarrier is excluded) of system frequency bandwidth by padding 0 to both ends of the sequence. The SSS is a sequence having a length 62 obtained by frequency-interleaving two sequences each having a length of 31.

PBCH (Physical Broadcast Channel)

Figure 6:
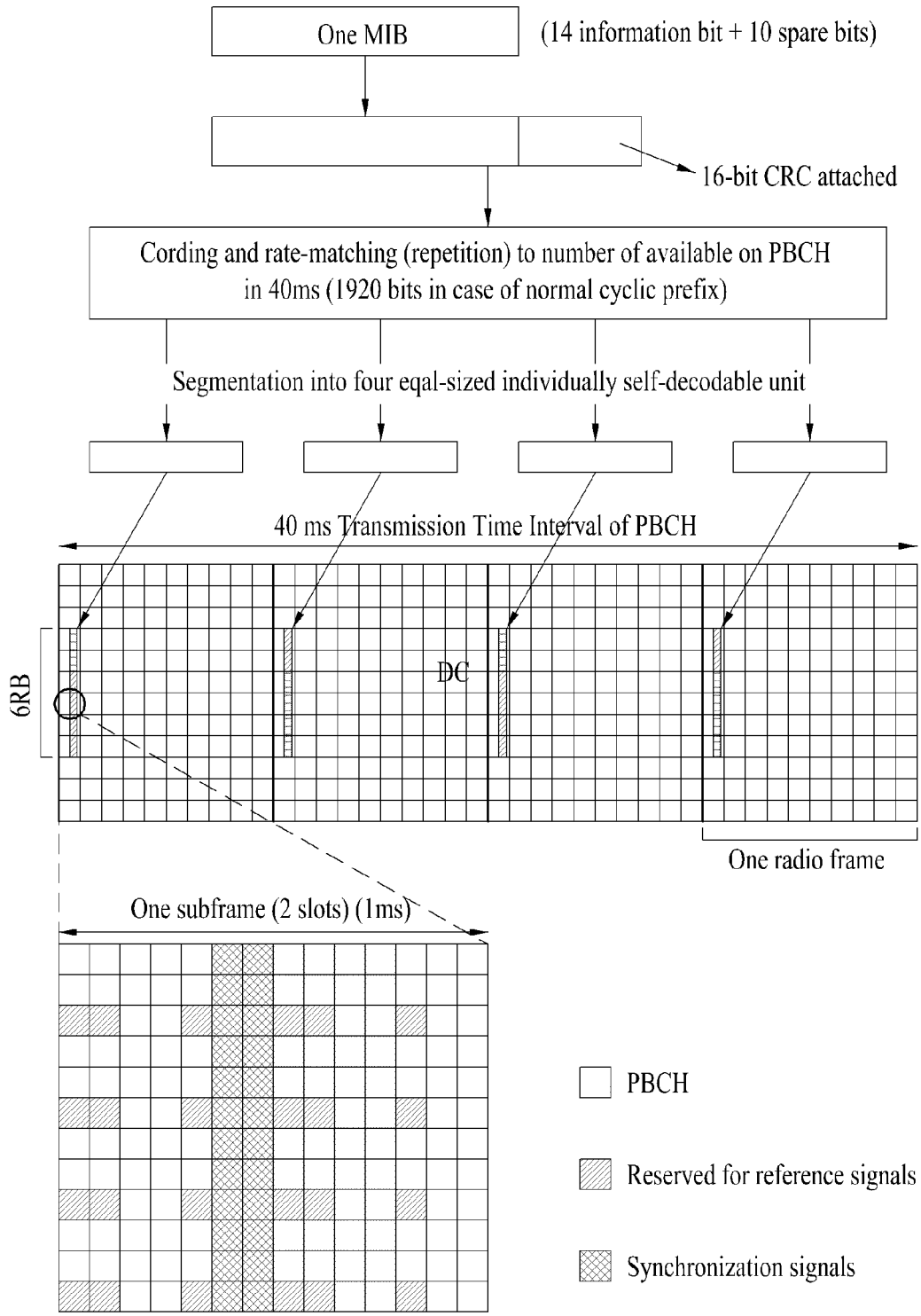
FIG. 6 is a diagram illustrating a PBCH.

FIG. 6 illustrates a PBCH. The PBCH is a channel for transmitting system information corresponding to a master information block (MIB) and is used when a UE acquires synchronization via the above-described PSS/SSS, acquires a cell identifier and acquires system information. The MIB may include downlink cell bandwidth information, PHICH configuration information, subframe number (system frame number (SFN)), etc.

One MIB transport block is transmitted via a first subframe of each of four consecutive radio frames, as shown in FIG. 6. More specifically, the PBCH is transmitted at the first four OFDM symbols of a second slot of a $0^{th}$ subframe of four consecutive radio frames. Accordingly, the PBCH for transmitting one MIB is transmitted with a period of 40 ms. The PBCH is transmitted on 72 subcarriers of overall bandwidth on a frequency axis, which correspond to 6 RBs which are the smallest downlink bandwidth, in order to enable the UE to decode a BCH without problems even when the size of the entire system bandwidth is unknown.

Hereinafter, various methods for performing D2D communication at a UE will be described based on the above description. In the following description, a UE participating in D2D communication is referred to as a dUE, a UE communicating with an eNB in coverage of a specific cell is referred to as a cUE, a dUE which is out of coverage of a specific eNB is referred to as an OdUE, and a dUE which is in coverage of the specific eNB is referred to as an IdUE. The OdUE and the cUE may be associated with different cells. In addition, D2D DL indicates reception operation upon D2D communication and D2D UL indicates transmission operation upon D2D communication. An uplink resource for a UE for performing D2D communication may be referred to as D2D UL (DUL) (resource) and a downlink resource for a UE for performing D2D communication may be referred to as D2D DL (DDL) (resource). In order to distinguish between DUL and DDL, uplink resources and downlink resources used by the eNB and the UE within the cell may be referred to as cellular UL (CUL) and cellular DL (CDL). Hereinafter, uplink resource and downlink resource mean cellular UL and cellular DL, respectively.

D2D Communication Performed Using Downlink Resources—from the Viewpoint of Out-of-Coverage UE A D2D UE may perform communication using resources (DUL and DDL) for D2D communication as described below or may perform D2D communication using downlink resources. However, D2D communication using downlink resources may cause significant interference with cellular UEs communicating with the eNB and thus need to be considered. A UE which performs or will perform D2D communication using downlink resources may be in or out of cell coverage.

If the UE is out of cell coverage, downlink resources may be fundamentally used without a separate instruction of the eNB. Here, downlink resources may be used as additional resources for throughput enhancement of D2D communication (D2D control signal or basic data communication) via uplink resources. The UE may determine that the UE is out of cell coverage, i) if PSS/SSS detection has failed for a predetermined time, ii) if PDCCH decoding has failed for a predetermined time or iii) if an SNR is less than a specific threshold.

Figure 7:
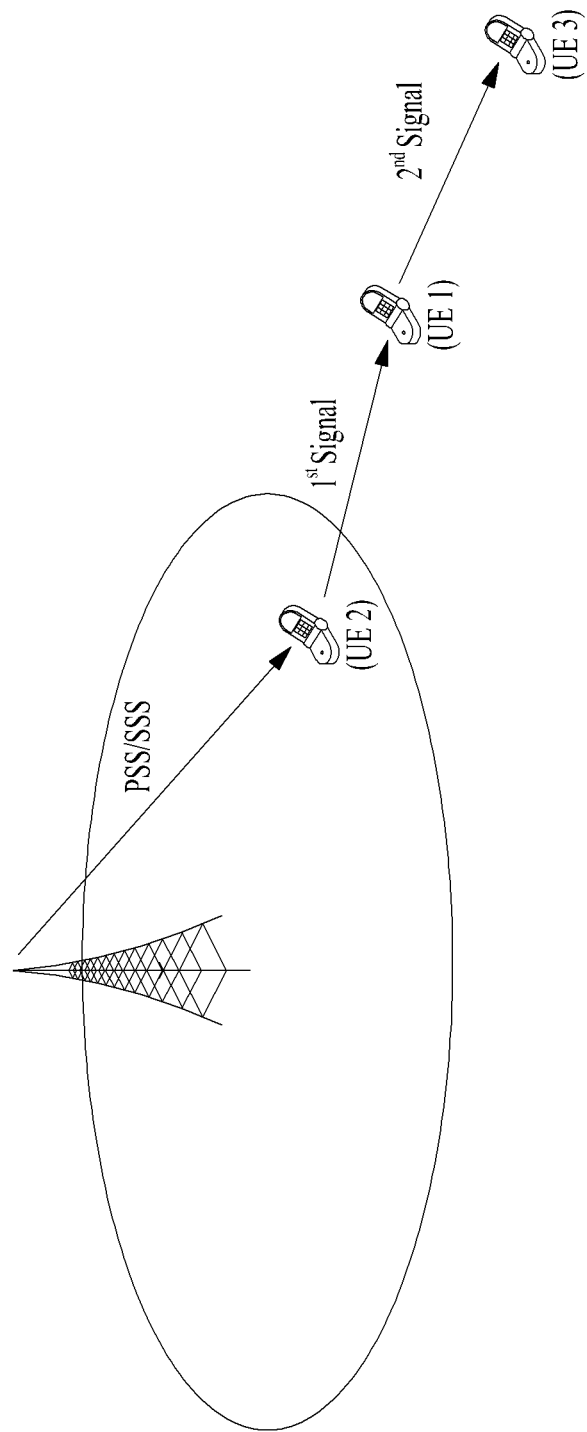
FIGS. 7 to 9 are diagrams illustrating an embodiment of the present invention.

If D2D communication is performed using downlink resources only because it is determined that the UE is out of cell coverage, severe interference may occur in cell-edge UEs. Accordingly, a first signal (which may be referred to as a warning signal or a synchronization signal according to usage thereof) may be used to determine the cell edge, in addition to the above-described method. For example, as shown in FIG. 7, a first UE UE1 which is out of the cell may confirm that the first UE is positioned at a position where D2D communication can be performed using downlink resources via a first signal transmitted by a second UE UE2. That is, the first signal enables the UE to confirm that the UE is out of the cell to perform D2D communication using downlink resources without a separate instruction of the eNB. This may be understood as a guard region for protecting cell-edge UEs from interference caused by D2D communication using downlink resources.

The first signal may be equal/similar to a signal having a predetermined pattern, a new signal applied to cell-edge UEs or an existing reference signal. If a new signal is defined as a first signal, all or some signal configuration information such as the transmission region of the first signal, sequence information, a transmission period, a transmitted subframe number or a transmission time offset may be signaled to other UEs. If the signal configuration information is predetermined, additional signaling of the signal configuration information may be unnecessary. If the existing reference signal is reused as the first signal, for example, a specific pattern of an SRS or a PRACH may be applied to cell-edge UEs and the cell-edge UEs may periodically/aperiodically transmit the first signal. If an SRS is used as a first signal, all or some SRS parameters (SRS comb type, SRS bandwidth, frequency domain position, SRS hopping bandwidth, duration, SRS configuration index and SRS cyclic shift) may be pre-signaled to a cUE and an OdUE. Alternatively, if an RACH is used as a first signal, all or some RACH parameters (preamble formats 0 to 4 and RACH preamble ID) may be pre-signaled to a cUE and an OdUE. Here, the transmission region of the RACH may be less or greater than 6 RBs. If the transmission region of the RACH is set to be less than 6 RBs, the other RBs are used for other purposes and interference with adjacent RBs may be reduced. If the transmission region of the RACH is set to be greater than 6 RBs, detection performance of the signal of the OdUE by the cUE may be increased. As described below, if a synchronization signal is used as a first signal, the synchronization signal may have the structure equal/similar to that of a PSS/SSS. For example, the PSS/SSS may be repeatedly transmitted or the transmission period of the PSS/SSS may be several tens or hundreds of ms, which is significantly greater than an existing period. Alternatively, the PSS/SSS may not be transmitted at center 6 RBs of the frequency bandwidth but may be transmitted in a predetermined frequency domain.

Although the first signal is preferably detected by the UEs, which are out of cell coverage, and is used as described below, the cUE may detect and use the first signal for power settings, resource assignment, etc. related to D2D communication.

Detection of the first signal by the cUE may be performed according a direct instruction of the eNB for operation for searching for the first signal. For example, the eNB may instruct the cUE to search for the first signal using a physical layer signal or a higher layer signal. More specifically, the instruction to search for the first signal may be included in a specific field of a PDCCH and a paging message and the first signal may be searched for using the idle state of a PBCH. The cUE, which has received the instruction to search for the first signal, may search for the first signal using resources such as pre-signaled subframes or symbols.

In operation for detecting the first signal of the OdUE, a predetermined subframe may be emptied (that is, D2D communication is terminated) and the first signal may be searched for. Among D2D UEs, a UE for receiving data may perform operation for searching for the first signal while receiving data. Here, the search period, duration, etc. of the first signal may be predetermined between the OdUE and the cUE for transmitting the first signal. The format, transmission period and duration information of the first signal may be pre-signaled to the OdUE by a network or may be predetermined. If an RACH is reused as a first signal, the cell-edge UE may transmit the RACH having a predetermined ID in a specific subframe and OdUEs may scan the RACH of the ID and format in a radio frame on which the RACH is transmitted. Information on the RACH signal (preamble formats (0 to 4), RACH preamble ID, etc.) may be pre-signaled to the OdUE.

If an out-of-coverage UE is changed from an idle state to an out-of-coverage state, first signal information may be included in a paging signal. In case of FDD, in downlink resources, operation for searching for a PSS/SSS for a predetermined period (or always) may be performed in order to determine eNB coverage and, in uplink resources, D2D communication may be terminated and the first signal may be searched for in order to check whether a cell-edge UE is present. In TDD, since uplink and downlink subframe boundaries may be entirely different, the PSS/SSS is searched for in all or some of subframes of a predetermined first signal search area and the first signal of the cUE may be searched for in all or some of the subframes. At this time, the search period and length of the first signal in downlink/uplink resources may be predetermined between UEs and the period may be changed. In FDD, since propagation may be changed between bands, a constant value may be compensated for after detection to determine a guard region of a DL band. In TDD, the guard region may be directly determined.

As the above-described operation, a UE, which has detected the first signal, may operate as follows.

i) The UE, which has received the first signal, may set/determine transmit power of D2D communication based on receive power of the first signal. For example, if the receive power of the first signal is large, the UE may recognize that a cell-edge UE is present at a short distance and set D2D transmit power in inverse proportion to the receive power.

ii) D2D communication may be performed only in a resource block in which the receive power of the first signal is less than or equal to a predetermined value. In other words, an RB having receive power less than or equal to a specific threshold in the transmission band of the first signal (an RB of an uplink band in case of FDD or an RB corresponding to a UL/DL SF because the OdUE has a high probability that a subframe boundary is shifted in case of TDD) may be used for D2D communication and an RB having receive power exceeding the threshold may not be used for D2D communication.

iii) The first signal may include target IoT of a UE for transmitting a first signal or D2D maximum transmit power and information on the transmit power of the UE for transmitting the first signal. Using such information and the receive power of the first signal, transmit power in uplink and/or downlink resources of D2D communication may be determined.

iv) The UE may determine the transmit power of a D2D UL band based on the receive power of the first signal and determine a value having a predetermined offset size with the transmit power of the D2D UL band as the transmit power of a D2D DL band. That is, the UE, which has received the first signal, determines differently transmit/receive power of D2D DL resources and D2D UL resources used for D2D communication.

v) If the strength of the received first signal is greater than a predetermined value, D2D communication may be terminated during N radio frames/subframes from the reception time. For example, if the first signal is transmitted once on M frames, N frames from among the frames, on which the first signal is transmitted, are set to blank, such that the OdUE does not perform D2D communication. If the cUE receives the first signal and detects the first signal with strong receive power, D2D communication may not be performed on some frames from the reception time.

vi) Terminating D2D communication for a predetermined time (corresponding to v) may be performed by combining i to iv. For example, control of D2D transmit power and resource assignment are applicable to only N frames after receiving the first signal.

vii) In case of v and vi, the cUE or D2D UE may separately perform RLM/RRM/CSI measurement with respect to N frames, since interference from the d2d UE is low in N frames from the transmission time of the first signal.

viii) The UE may not perform RRM/RLM/CSI measurement or may perform separate RRM/RLM/CSI measurement, in a region in which the first signal is received.

ix) After the first signal is received, the information may be relayed to neighboring dUEs. When a specific dUE receives the first signal in a search area, such information may be relayed to neighboring dUEs. As the relay method, a method of retransmitting the first signal, a method of signaling such information to neighboring dUEs using a channel predetermined between dUEs and a signal of a specific format, etc. may be used.

The first signal may be transmitted/used for synchronization of the out-of-coverage UE. More specifically, the in-coverage UE (more particularly, the cell-edge UE) may transmit the first signal according to the instruction of the eNB as described above. The out-of-coverage UE may receive and use the first signal to acquire synchronization related to D2D communication. The out-of-coverage UE may receive and relay the first signal to other UEs (the present invention is not limited thereto and the in-coverage UE, which has received the first signal, may also relay the first signal). Relay of the first signal, that is, relay of synchronization is shown in FIG. 7.

Referring to FIG. 7, a second UE UE2 may receive a synchronization signal (PSS/SSS) from the eNB and transmit a first signal to a first UE UE1 based on the synchronization signal. The first UE UE1 being out of the coverage of the cell to which the second UE UE2 belongs may relay a second signal based on the received first signal to a third UE UE3. In this case, the first UE may acquire synchronization related to D2D communication from the first signal. Similarly, the third UE may acquire synchronization related to D2D communication from the second signal.

The first signal as the synchronization signal may be equal to the PSS/SS or may be a modified PSS/SSS. For example, a sequence for a PSS and a sequence for an SSS configuring the first signal may be mapped to 62/x subcarriers excluding a direct current (DC) subcarrier and 62/y subcarriers excluding the DC subcarrier and transmitted (x and y being values selected from divisors of 62). In other words, the first signal may be shorter or longer than an existing PSS/SSS. The second signal may also be equal to the first signal or shorter or longer than the PSS/SSS transmitted by the eNB or the first signal. As another example, the PSS/SSS may be repeated a predetermined number of times.

The first signal may be transmitted with a specific offset from the PSS/SSS reception time of the eNB. The second signal may also be transmitted with a predetermined offset from the first signal. That is, the PSS/SSS of the eNB and the first signal or the first signal and the second signal may be different in the time and/or frequency domain. In other words, the first signal is transmitted in a time and/or frequency region which does not overlap a PSS and SSS transmitted by a serving cell of the second UE UE2 and the first UE UE1 may deliver the same second signal as the received first signal to the third UE UE3 via resources different from time and/or frequency resources used to receive the first signal.

The UE may perform synchronization with the eNB in an in-coverage area and operate in synchronization in group units (by selecting a representative UE) in an out-of-coverage area. A PSS/SSS sequence used in the in-coverage area and a PSS/SSS sequence (transmitted by a specific UE) used in the out-of-coverage area (a newly designed sequence or a sequence obtained by expanding or reducing an existing PSS/SSS) may be separated. At this time, the PSS/SSS transmitted by the UE may have the same format as the above-described synchronization signal. Alternatively, although the PSS/SSS transmitted by the UE may have the same format as the above-described synchronization signal, the transmission frequency position of the PSS/SSS may be a predetermined position. Accordingly, (in case of TDD), the PSS/SSS transmitted by the eNB and the PSS/SSS transmitted by out-of-coverage representative UEs may be clearly distinguished. If a group of representative UEs moves into a range in which the PSS/SSS of the eNB may be received (apart from eNB PSS/SSS measurement method), synchronization with the eNB is performed. If interference is very severe (that is, is equal to or greater than a threshold), synchronization may be mandatorily performed. If a group of representative UEs detects a PSS/SSS transmitted by another group of representative UEs, a separate operation may not be performed and then, if the strength of the signal of the PSS/SSS of another group of representative UEs becomes equal to or greater than a threshold, a procedure of performing synchronization therebetween may be performed.

For search of the first signal, the OdUE (or cUE) may terminate D2D communication and search for the first signal. For example, if an RACH is used as a first signal, the cUE may transmit the first signal in a predetermined subframe or radio frame and the dUE may terminate D2D communication in some subframes of the radio frame and scan the first signal. For example, the OdUE, which has entered an out-of-coverage area (a UE declares RLF, the strength of an RSRP is equal to or less than a specific threshold or a PDCCH decoding failure probability is equal to or greater than a specific threshold (which may be different from the threshold of the RLF)), may operate a timer and increase the length of subframes (or symbols or radio frames) for searching for the first signal in proportion to the timer, after being in the out-of-coverage area. This is because, as time passes after entering the out-of-coverage are, the subframe boundary is shifted and thus more periods should be searched.

Hereinafter, FDD and TDD will be described in detail based on the above description.

In case of FDD, if all UEs participating in D2D have failed in PSS/SSS detection in downlink resources for a long time, the UEs are determined as being out of coverage and downlink resources are regarded as D2D candidate resources. Search may be performed using uplink resources for a predetermined period, for guard region detection, and a dUE, which has moved away from the guard region, may perform D2D communication using downlink resources. In case of FDD, a compensation factor may be introduced into a detection probe according to a difference in downlink/uplink band. In addition, all downlink resources are controlled via an uplink band. That is, an uplink resource is regarded as a PCell and a downlink band becomes an SCell, such that cross carrier scheduling is performed by the PCell.

Since the UE may directly configure usage of DL resources only when all UEs are out of coverage, information indicating whether two UEs are in coverage or out of coverage may be signaled to another D2D UE upon D2D link setup. For example, information indicating whether the UE is in coverage or out of coverage may be embedded into a discovery signal and transmitted. If it is determined that all the D2D UEs are out of coverage, one of the D2D UEs may directly configure usage of downlink resources via UL resources. Via the signal delivered at this time, information indicating which subframe of downlink resources is used as D2D DL/UL may be delivered. If one UE among dUEs is in coverage, the UE or the eNB may indicate whether DL resources are used.

If downlink resources are used in the out-of-coverage area and then the UE is moved to the in-coverage area, if the first signal is received, or if receive power of the first signal is equal to or greater than a predetermined threshold, usage of downlink resources should be terminated. The eNB may directly instruct the cUE to perform operation for terminating usage of downlink resources and the OdUE may detect the PSS/SSS and the first signal and directly terminate usage of downlink resources. Prior to this, in order to determine whether the D2D UE is in coverage or out of coverage, D2D data transmission should not be performed at PSS/SSS position. Accordingly, the OdUE may not use center 6 RBs of all subframes of the (FDD) DL band, for D2D. When the UE is in coverage, since the subframe boundary of the cellular network is known, only the PSS/SSS positions of 0th and fifth subframes are not used. However, when the UE is out of coverage, since the subframe boundary of the cellular network is not known, all subframes are not used for D2D, for measurement. If downlink bandwidth is small, since 6 RBs are not continuously used, throughput boosting effects due to usage of the downlink band are reduced. Accordingly, in this case, center 6 RBs of the downlink band may be periodically used for D2D. The D2D UE does not use 6 RBs for D2D communication with a specific period and performs cell search operation. At this time, a monitoring length should be equal to or greater than a predetermined length (e.g., 10 ms=radio frame) and the period may be configured according to circumstance. A PSS/SSS monitoring period may be variably configured. A time when cell search has failed may be measured by the timer to change the period. For example, the UE, which has entered the out-of-coverage area, may operate the timer and increase the cell search period in proportion to the length of the timer. Such operation is performed by the UE for performing D2D reception in the downlink band. If the cell ID of the cellular eNB is detected via PSS/SSS search, this is immediately transmitted to the D2D transmission UE (for example, a specific signal may be transmitted using predetermined time/frequency resources or may be signaled using a discovery signal or signal 1) to terminate usage of the D2D DL band. For guard region search, even in the uplink band, search is performed with a predetermined period. UEs, which have failed in PSS/SSS detection, set the predetermined period (e.g., 100 ms) of the guard region search and perform search. At this time, since the subframe boundary of the cellular network is not known, first signal search of the UE may be performed for a predetermined time (e.g., 10 ms).

If operation for emptying center 6 RBs of all subframes in the out-of-coverage area is inefficient, a method of always emptying some downlink resources (OFDM symbol unit, subframe unit, etc.) and performing energy detection may be performed. This method is advantageous in that the number of unused RBs used for monitoring is reduced, but is disadvantageous in that cell search performance is reduced because a known sequence is not detected. In this method, if energy detection exceeds a specific threshold, the UE may perform operation for emptying center 6 RBs from a next subframe and searching for a PSS/SSS.

In case of TDD, if all UEs participating in D2D have failed in PSS/SSS detection in downlink resources for a long time, the UEs are determined as out-of-coverage UEs and downlink resources are regarded as D2D candidate resources. Search may be performed using uplink resources for a predetermined period, for guard region detection, and a dUE, which has moved away from the guard region, may perform D2D communication using downlink resources.

If the UE has failed in PSS/SSS detection in the downlink subframe for a long time, the UE is determined as being out of coverage and downlink resources are regarded as D2D candidate resources. If the dUE is out of the guard region, downlink resources may be regarded as being completely used. Accordingly, the dUE performs cell search in the downlink subframe and also searches for the first signal in the uplink subframe. At this time, all downlink resources are controlled via the uplink subframe. At this time, all D2D UEs are determined as being out of coverage (as being out of the guard region). In this case, if D2D communication between the UEs is requested, a TDD configuration between dUEs different from a configuration in an existing cellular network may be used. Such a TDD configuration for D2D may be referred to as a D2D default TDD configuration. For example, in the out-of-coverage area, a $0^{th}$ TDD configuration may be used as the D2D default configuration. If the $0^{th}$ configuration is used as the TDD configuration, a plurality of subframes is composed of UL, resources available for D2D communication are increased and the amount of signals for controlling the downlink subframe is decreased, thereby increasing efficiency. Although such a D2D default TDD configuration is basically used in the out-of-coverage area, the D2D default TDD configuration may also be used when no cellular UE is present at a short distance or when a PSS/SSS signal is detected but the strength thereof is weak (equal to or less than a specific threshold).

Such a TDD configuration for D2D may be changed. Upon initial D2D link setup, a lastly used TDD configuration may be used as the TDD configuration. The TDD configuration may be changed to the D2D default configuration if the out-of-coverage state continues, by measuring the timer between dUEs.

If the D2D default TDD configuration is not defined in the out-of-coverage area, D2D communication may be performed using the TDD configuration used in the existing coverage. In this case, usage of the downlink subframe is controlled by the default D2D link of the uplink subframe.

In the TDD configuration, some downlink subframes may be dynamically changed to uplink subframes (in order to increase uplink resources to boost D2D throughput) or some uplink subframes may be dynamically changed to downlink subframes in order to increase downlink resources to appropriately perform cell search of the cellular network.

D2D Communication Performed Using Downlink Resources—from the Viewpoint of in-Coverage UE Although the dUE fundamentally performs D2D communication using uplink resources, the eNB may permit usage of downlink resources in some cases. In other words, uplink resources may be used as default resources for D2D and downlink resources may be used for throughput boosting as well as control such as discovery.

In downlink resources, when D2D UEs perform transmission using the OFDM scheme, the eNB may directly indicate the ID of a scrambling sequence of a reference signal, transmit power information and information on resources available for D2D (in the in-coverage area). Additionally, the eNB may also indicate information on a subframe in which an MBSFN configuration is impossible. Such indication information may be directly signaled to one or both of transmission and reception UEs among the D2D UEs (If the position information is signaled to only a specific dUE, the dUE, which has received the position information, delivers the position information to another dUE.) At this time, the ID of the RS transmitted by the D2D transmitter different from that of the neighboring eNB and D2D UE should be assigned. Information on resources available for D2D may be implicitly considered as the remaining region excluding a PDCCH, a PDSCH (assigned to the corresponding dUE) and an EPDCCH in DCI. Meanwhile, the in-coverage dUEs do not use OFDM symbols, on which the PSS/SSS is transmitted, for D2D but empties the OFDM symbols in the downlink band, for cell search. In addition, for RSRP measurement from the eNB, the CRS position is not used but is emptied. In other words, in order to perform measurement from the eNB in the in-coverage area, the PSS/SSS/PBCH and CRS positions are not used for D2D but are emptied. In addition, a paging signaling region may also not be used for D2D but may be emptied. Here, the dUE for transmitting data in the D2D link using downlink resources in D2D communication cannot perform data reception and measurement from the cellular eNB and thus may trigger a DRX mode. At this time, for D2D communication, a DRX duration may become greater than 40 ms.

Downlink resources of the cellular network may be used as one or more of i) subsidiary resources (band or subframe) of D2D UL, ii) subsidiary resources of D2D DL and iii) subsidiary resources of D2D UL/DL. In case of i) and ii), a part of the downlink band of the cellular network (the remaining region excluding a part for communication with the cellular network) is only used for a subsidiary band of the D2D UL or DL link. Accordingly, downlink resources may be divided into a region for maintaining communication with the cellular network and a region for D2D communication. Similarly to UL resources, downlink resources may be divided and used in a time domain. Resources may be divided into subframe units or frame units. If resources are divided into subframe units, some subframes may be used for D2D and the remaining subframes may be used for communication with the eNB (the same is true if the resources are divided into radio frame units). Such a subframe configuration for D2D may be directly indicated by the eNB. A configuration for D2D may be signaled to all D2D UEs via RRC or DCI (in new DCI for a D2D configuration or, for example, existing DCI, a TPC field or an ARO (A/N resource offset) field may be reused to assign downlink resources in D2D DL resource). In case of iii), downlink resources may be divided into three regions (D2D UL/DL and cellular DL). At this time, all resource configurations of the three regions may be indicated by the eNB or only the D2D/cellular region is indicated by the eNB and D2D UL/DL may be indicated by the UE within the D2D region.

D2D Communication Performed Using Uplink Resources

Uplink resources may be divided into a D2D DL region, a D2D UL region and an eNB UL region. The eNB UL region is a region for maintaining communication with the eNB and may be configured by the eNB (in the in-coverage area) and by the UE (in the out-of-coverage area). In addition, since D2D communication is performed using uplink resources, assume that SC-FDMS is used. However, the proposed method is not limited to SF-FDMA and is applicable to a system which operates using OFDMA in an uplink band. As a criterion for dividing uplink resources into three regions, time and frequency may be used. If the resource regions are divided in the frequency domain, a guard band and a new RF filter may be required. Therefore, assume that uplink resources are divided in the time domain. In the time domain, resources may be divided in SC-FDM symbol units or subframe units.

Figure 8:
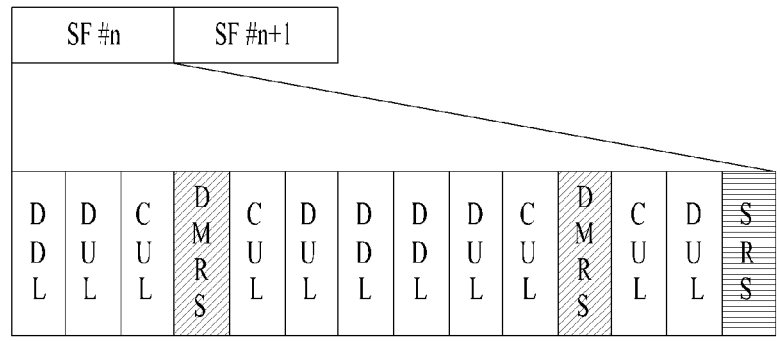

If resources are divided in SC-FDM symbol units (in this case, circuit switching performance is very good and thus a guard period may be scarcely required. If a sum of a transient period and delay spread of a power amplifier is less than a CP length, an additional guard period is unnecessary), the region for communication with the eNB may preferentially use the periphery of the DMRS in each subframe. This is because a D2D link has better link quality than that of an eNB link at a short distance and thus channel estimation performance may be better. FIG. 8 shows an example of dividing resources.

Figure 9:
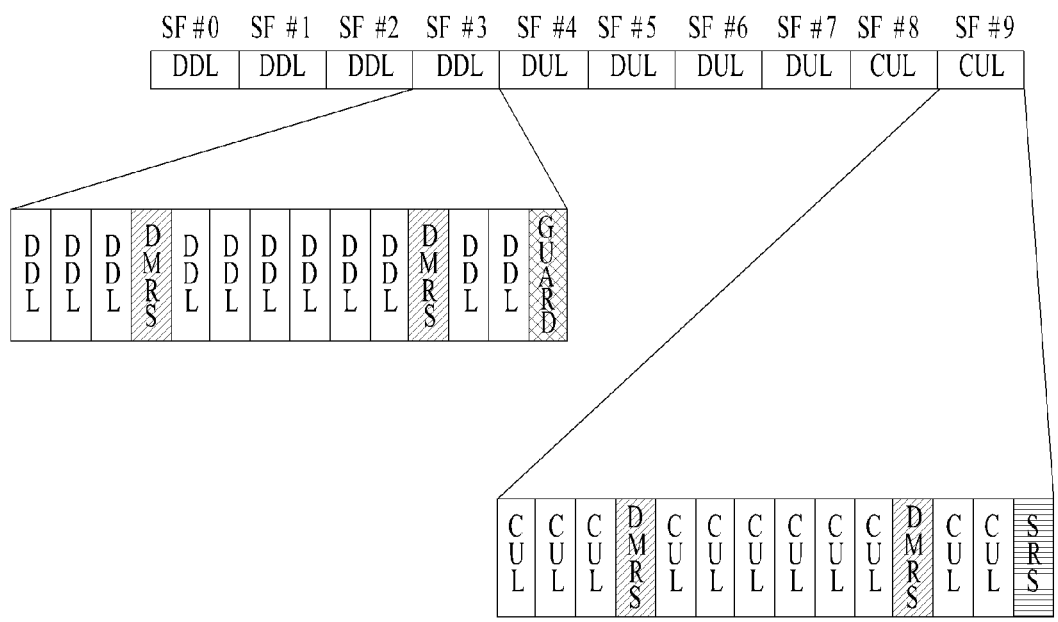

Unlike FIG. 8, UL resources may be divided and used in subframe units as shown in FIG. 9. If the UL resources are divided in subframe units, some uplink subframes may be assigned for communication with the eNB and the remaining uplink subframes may be assigned for D2D communication. Such a configuration/setting may be indicated by the eNB (in the in-coverage area) and may be directly configured between dUEs (in the out-of-coverage area). At this time, the last symbol of the last subframe may not be used to transmit the SRS in the D2D DL and D2D UL boundary but may be set as a guard symbol for UL/DL switching (if the sum of a DL/UL switching period and delay spread of a power amplifier exceeds a CP length, a guard symbol may be configured). Such a guard symbol may be configured when DL is switched to UL or UL is switched to DL and a guard symbol may be restrictedly configured between consecutive cellular UL and D2D UL subframes. For example, if a difference in transmit power between the D2D UL subframe and the cellular UL frame exceeds a specific threshold to increase the transient period of the power amplifier, the guard symbol may be configured. Fundamentally, since both the D2D UL subframe and the cellular UL subframe use the transmission circuit, if the difference in transmit power is small, the transient period is less than the CP length and thus the guard symbol is not required. If the cellular UL subframe is switched to the D2D DL subframe, the first symbol of the D2D subframe may be configured as the guard symbol, in order to maximally protect the subframe structure in communication with the eNB. Such a guard symbol may be used as an empty region, an SC-FDM symbol having a short length (using only some RBs in entire system bandwidth) is transmitted and the remaining region may be set as the guard period. The above description relates to division of uplink resources in the time domain. However, even when the dUE uses downlink resources of the cellular network, similarly, resources may be divided in the time domain. Similarly to UL, the resource region of D2D/cellular DL may be divided in OFDM symbol units or subframe units. If the resources are divided in OFDM symbols units, performance of the switching circuit is good and the guard period is scarcely required. If the dUE is in coverage, the dUE receives a PDCCH and maintains the link with the eNB and thus the PDCCH region of every SF is not used for D2D. If the dUE is out of coverage, since no signal is received from the eNB in the PDCCH region, the PDCCH region may be used for cell search of the cellular network (energy detection) or D2D link.

If the dUE uses downlink resources and a last symbol or a first symbol is used as a guard symbol, some RSs may not be transmitted. In this case, the RS position may be differently configured to solve a problem that the RSs are not transmitted. For example, if the last symbol is used as the guard symbol, the position of the DMRS transmitted on the second slot may be changed.

Configuration of Apparatus According to Embodiment of the Present Invention

Figure 10:
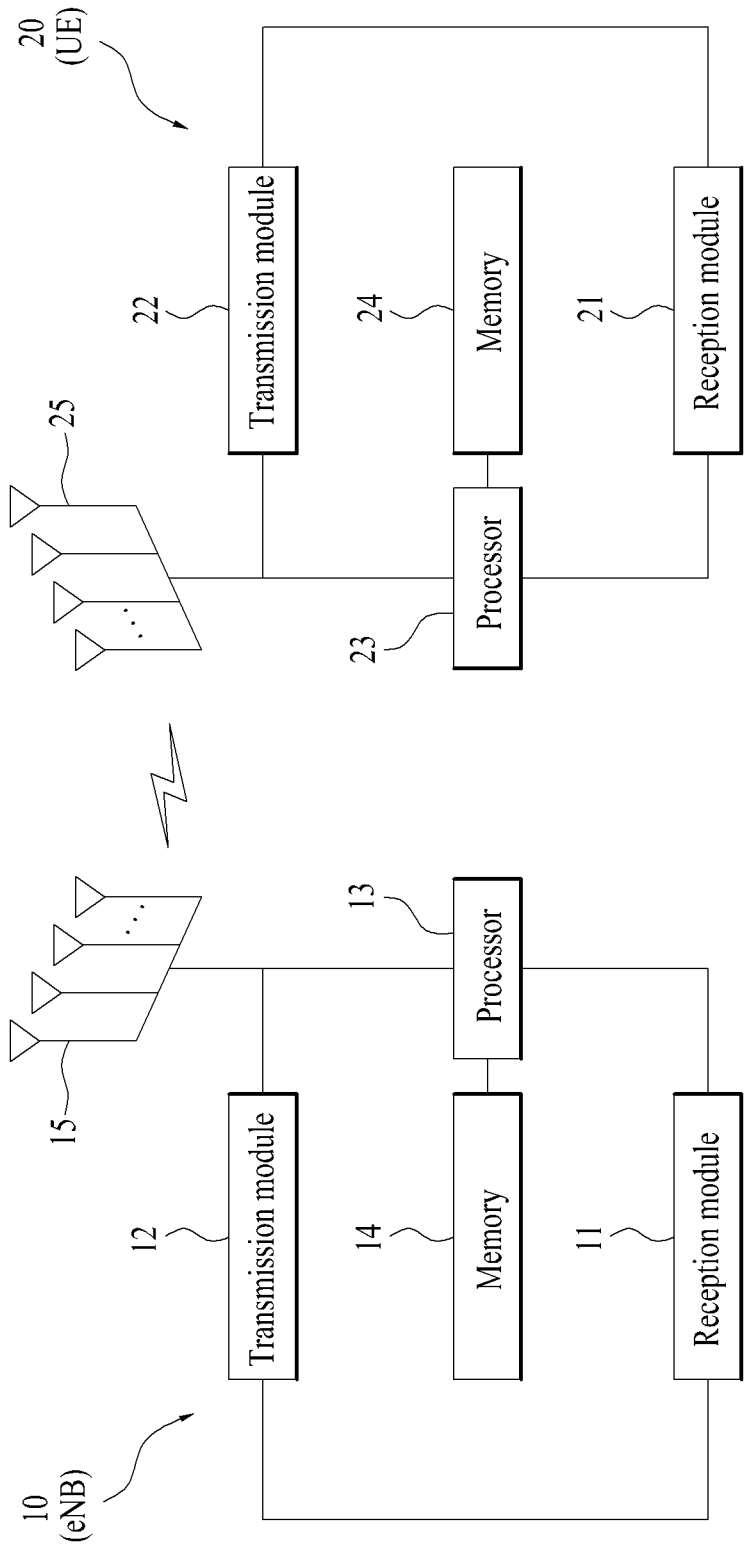
FIG. 10 is a diagram showing the configuration of transmission and reception apparatuses.

FIG. 10 is a diagram showing the configuration of a transmission point apparatus and a UE apparatus according to an embodiment of the present invention.

Referring to FIG. 10, the transmission point apparatus 10 according to the present invention may include a receive module 11, a transmit module 12, a processor 13, a memory 14 and a plurality of antennas 15. Since the plurality of antennas 15 is used, the transmission point apparatus may support MIMO transmission/reception. The receive module 15 may receive a variety of signals, data and information from the UE in uplink. The transmit module 12 may transmit a variety of signals, data and information to the UE in downlink. The processor 13 may control the overall operation of the transmission point apparatus 10.

The processor 13 of the transmission point apparatus 10 according to one embodiment of the present invention may process the operations necessary for the above-described embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 10, the UE apparatus 20 according to the present invention may include a receive module 21, a transmit module 22, a processor 23, a memory 24 and a plurality of antennas 25. Since the plurality of antennas 25 is used, the UE apparatus may support MIMO transmission/reception. The receive module 25 may receive a variety of signals, data and information from the eNB in downlink. The transmit module 22 may transmit a variety of signals, data and information to the eNB in uplink. The processor 23 may control the overall operation of the UE apparatus 20.

The processor 23 of the UE apparatus 20 according to one embodiment of the present invention may process the operations necessary for the above-described embodiments.

The processor 23 of the UE apparatus 20 may process information received by the UE apparatus 20 and information to be transmitted to an external device and the memory 14 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 10, the description of the transmission point apparatus 10 may also be equally applied to a device functioning as a downlink transmission entity or an uplink reception entity. The description of the UE apparatus 20 may also be equally applied to a relay station device functioning as an uplink transmission entity or a downlink reception entity.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for performing device-to-device (D2D) communication with a second user equipment (UE) by a first UE in a wireless communication system, the method comprising:
   receiving a first signal from the second UE; and
   delivering a second signal based on the received first signal to a third UE,
   wherein the first and second signals are used for synchronization acquisition related to D2D communication in each of the first UE and the third UE,
   wherein the first signal comprises a primary synchronization signal (PSS) and a secondary synchronization signal (SSS) received from a serving cell of the second UE,
   wherein a sequence for the PSS is mapped to 62/x subcarriers excluding a direct current (DC) subcarrier,
   wherein a sequence for the SSS is mapped to 62/y subcarriers excluding the DC subcarrier,
   wherein x and y are values selected from divisors of 62.

2. The method according to claim 1, wherein the first UE is out of coverage of a cell to which the second UE belongs.

3. The method according to claim 1, wherein the first signal and the second signal are transmitted using different time/frequency resources.

4. The method according to claim 1, wherein the first signal is transmitted in time/frequency resources which do not overlap with time/frequency resources in which a PSS and a SSS are transmitted by a serving cell of the second UE.

5. The method according to claim 1, wherein the first UE delivers the same second signal as the received first signal to the third UE via time-frequency resources different from time-frequency resources used to receive the first signal.

6. The method according to claim 1, wherein the first UE performs D2D communication only in a resource block in which receive power of the first signal is equal to or less than a predetermined value.

7. The method according to claim 1, wherein the first UE terminates D2D communication during N frames after receiving the first signal.

8. The method according to claim 1, wherein the first UE determines transmit power of D2D communication based on receive power of the first signal.

9. The method according to claim 8, wherein the transmit power of D2D communication is inversely proportional to the receive power of the first signal.

10. The method according to claim 1, wherein the first UE uses a downlink frequency band for D2D communication if receive power of the first signal is equal to or less than a predetermined value.

11. A user equipment (UE) apparatus for performing device-to-device (D2D) communication with a second UE in a wireless communication system, the first UE apparatus comprising:
 a reception module; and
 a processor,
  wherein the processor receives a first signal from the second UE and delivers a second signal based on the received first signal to a third UE, and
  wherein the first and second signals are used for synchronization acquisition related to D2D communication in each of the first UE and the third UE,
  wherein the first signal comprises a primary synchronization signal (PSS) and a secondary synchronization signal (SSS) received from serving cell of the second UE,
  wherein a sequence for PSS is mapped to 62/x subcarriers excluding a direct current (DC) subcarrier,
  wherein a sequence for SSS is mapped to 62/y subcarriers excluding the DC subcarrier, wherein x and y are values selected from divisors of 62.

* * * * *